(12) United States Patent
Garcia et al.

(10) Patent No.: US 9,942,397 B1
(45) Date of Patent: Apr. 10, 2018

(54) METHODS AND SYSTEMS FOR CUSTOMIZING INTERACTIVE VOICE RESPONSE CALLS

(71) Applicant: United Services Automobile Association (USAA), San Antonio, TX (US)

(72) Inventors: Patricio H. Garcia, San Antonio, TX (US); Amanda Jean Segovia, San Antonio, TX (US); Hector J. Castillo, San Antonio, TX (US); Janeen Rubio, Helotes, TX (US); Robert Craig Korom, San Antonio, TX (US); Roy David McDonald, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 15/436,413

(22) Filed: Feb. 17, 2017

Related U.S. Application Data

(62) Division of application No. 14/668,357, filed on Mar. 25, 2015, now Pat. No. 9,591,136.

(Continued)

(51) Int. Cl.
H04M 11/00 (2006.01)
H04M 3/493 (2006.01)
H04M 3/42 (2006.01)

(52) U.S. Cl.
CPC ....... H04M 3/493 (2013.01); H04M 3/42068 (2013.01); H04M 3/42161 (2013.01); H04M 2203/408 (2013.01); H04M 2203/551 (2013.01)

(58) Field of Classification Search
CPC ............ H04M 3/42068; H04M 3/493; H04M 3/42161

(Continued)

(56) References Cited

U.S. PATENT DOCUMENTS 8,406,388 B2    3/2013   Or-Bach et al.
8,488,774 B2*   7/2013   Mahalaha ........... H04M 3/5233
                                            379/265.01

(Continued)

OTHER PUBLICATIONS

Mannerhagen, Anders, "Smartphone apps for bank services—A design case", Department of Computer and Information Science, Linkoping University, Jun. 18, 2012, 60 pages.

(Continued)

Primary Examiner — Van D Huynh
(74) Attorney, Agent, or Firm — Perkins Coie LLP

(57) ABSTRACT

Methods and systems described in this disclosure allow customers to personalize their phone experience when calling into an organization. In some embodiments, customers who may benefit from this service are identified based on the content of the customer's previous or current phone calls to the organization. The identified customers may be invited to enroll and to provide preferences for a customized Interactive Voice Response experience. In some embodiments, the customer can elect to hear the balances of one or more of his accounts without going through a phone menu or asking a representative to look up the relevant amounts. Once enrolled, when the customer dials into the organization and upon successful authentication, the organization proactively states the customer's account balances with no further customer request.

18 Claims, 15 Drawing Sheets

Related U.S. Application Data

(60) Provisional application No. 61/971,969, filed on Mar. 28, 2014, provisional application No. 61/052,569, filed on Sep. 19, 2014.

(58) Field of Classification Search
USPC .................................................. 379/88.18
See application file for complete search history.

(56) References Cited

U.S. PATENT DOCUMENTS

| | | | |
|---|---|---|---|
| 8,494,152 B1 | 7/2013 | Roberts et al. | |
| 8,553,859 B1 | 10/2013 | Lavian et al. | |
| 8,767,927 B2 * | 7/2014 | Springer | H04M 3/493 |
| | | | 379/266.08 |
| 9,124,694 B2 | 9/2015 | Monegan et al. | |
| 9,313,332 B1 | 4/2016 | Kumar et al. | |
| 9,380,160 B2 * | 6/2016 | Jain | H04M 3/493 |
| 9,591,136 B1 * | 3/2017 | Garcia | H04M 3/5166 |
| 2008/0304639 A1 | 12/2008 | McDonough et al. | |
| 2010/0061534 A1 | 3/2010 | Wang et al. | |
| 2011/0106527 A1 | 5/2011 | Chiu | |
| 2013/0230156 A1 | 9/2013 | Farah et al. | |
| 2016/0142885 A1 * | 5/2016 | Li | H04W 4/06 |
| | | | 455/418 |

OTHER PUBLICATIONS

Scheele, Michael, "Callback technology, revenue on fast track", CommunicationsWeek International, Terrapinn Ltd., United Kingdom, Mar. 6, 1995, p. 40, Issue 140.

\* cited by examiner

...each time you call member or login.
☒ Learn More

○ Quick Access asks for your PIN. This is only available for phone numbers not shared with other members.

○ Combine iD and PIN requires your Member number or Social Security number and PIN.
☒ Enable

Quick Access Account
Hear your account balance at the beginning of the call, before talking to a representative.

Select Accounts                                                                  505

| Nickname | Type | Account Number | Quick Balance |
|---|---|---|---|
| | SAVINGS | ***** | ☐ |
| | CHECKING | ***** | ☐ |
| | MEMBER YOUTH SAVINGS | ***** | ☐ |
| | MEMBER SECURE CHECKING | ***** | ☐ |
| Micah Savings | SAVINGS | ***** | ☐ |
| | WORLD MASTERCARD | 54******** | ☐ |
| | PLATINUM MASTERCARD | 54******** | ☐ |
| | WORLD MASTERCARD | 54******** | ☐ |

( Cancel )   ( Save Preferences )

FIG. 5

METHODS AND SYSTEMS FOR CUSTOMIZING INTERACTIVE VOICE RESPONSE CALLS

CROSS-REFERENCE TO RELATED APPLICATIONS

This application is a divisional of U.S. application Ser. No. 14/668,357 entitled "METHODS AND SYSTEMS FOR CUSTOMIZING INTERACTIVE VOICE RESPONSE CALLS," filed Mar. 25, 2015, which is a non-provisional of and claims priority to U.S. Provisional Application No. 61/971,969, filed on Mar. 28, 2014, entitled "METHODS AND SYSTEMS FOR CREATING CUSTOMIZED VOICELINE PLANS;" and U.S. Provisional Application No. 62/052,569, filed on Sep. 19, 2014, entitled "METHODS AND SYSTEMS FOR CUSTOMIZING INTERACTIVE VOICE RESPONSE CALLS;" each of which are hereby incorporated by reference in their entireties for all purposes.

TECHNICAL FIELD

Various embodiments of the present disclosure generally relate to calls. More specifically, various embodiments of the present disclosure relate to methods and systems for customizing Interactive Voice Response calls.

BACKGROUND

Customers often call into an organization to receive a status update or the latest information relating to a service the organization provides or an account the customer holds with the organization. For example, customers may call to request a status of a financial account or insurance claim. The call may be answered by a customer service representative or by an Interactive Voice Response (IVR) system.

BRIEF DESCRIPTION OF THE DRAWINGS

Embodiments of the present disclosure will be described and explained through the use of the accompanying drawings in which:

FIG. 5 depicts an example of a user interface that can be used to select preferences in accordance with various embodiments of the disclosure;

Figure 1:
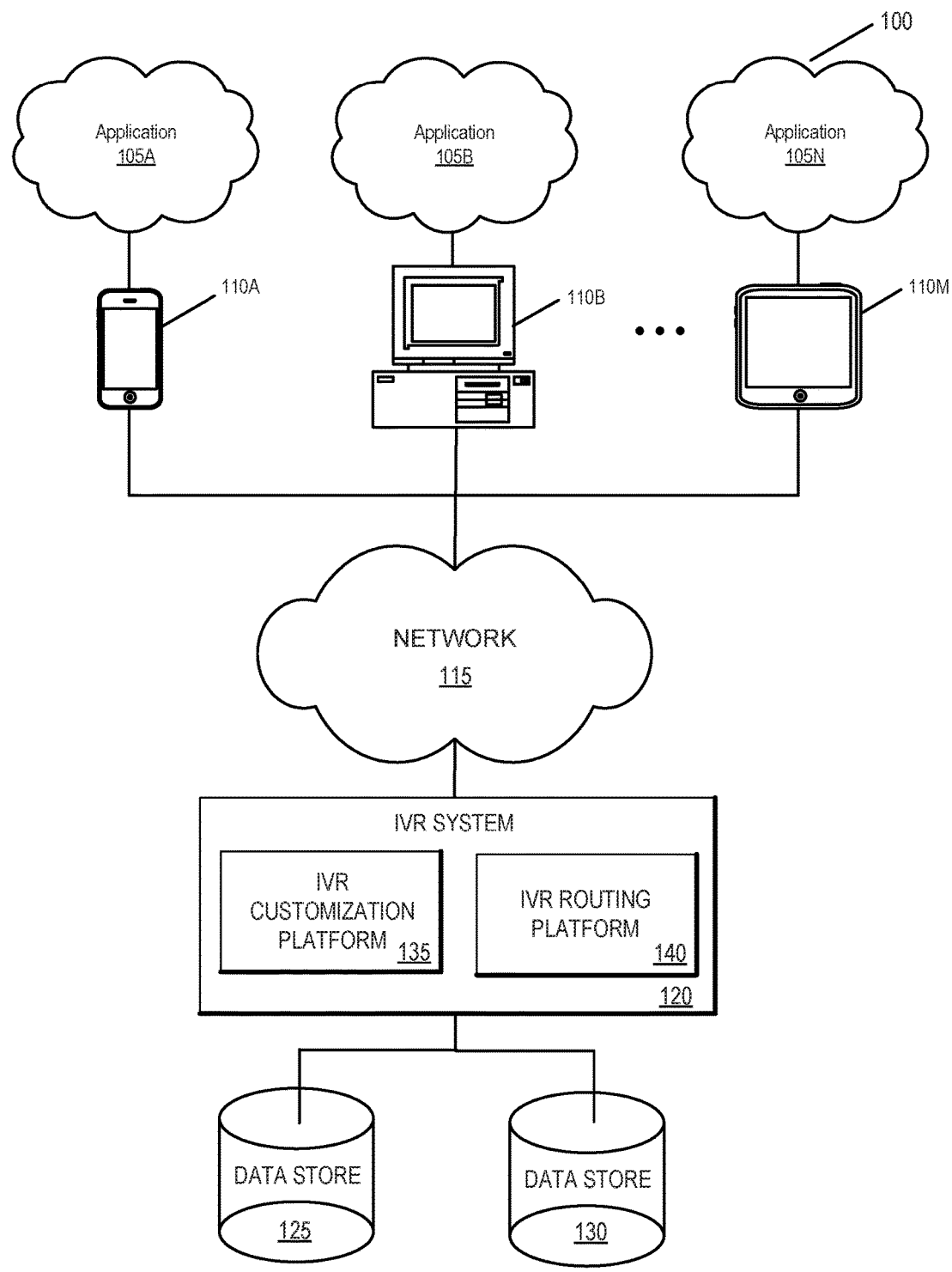
FIG. 1 illustrates an example of an operating environment in accordance with various embodiments of the disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to calls. More specifically, various embodiments of the present disclosure relate to methods and systems for customizing IVR calls.

Methods and systems described in this disclosure allow customers to personalize their experience when calling into an organization. Customers often call into an organization to receive a status update or the latest information relating to a service the organization provides. For example, customers may call to request the status of a financial account or an insurance claim. In many cases, the customer is forced to listen to several options and to navigate through an interactive voice response system (IVR) to reach a representative before obtaining the information he or she seeks. These time-consuming interactions can create a negative impression when the user is seeking information quickly.

In contrast, various embodiments allow for interactions that can allow for more efficient call handling and routing. As described herein, the user may call in, be identified and/or authenticated, and immediately thereafter be provided with the information that the user seeks without navigating through the typical options. For example, users may call a service provider to request account balances. Some users may call about this on a regular basis or with enough frequency that providing the account balances at the beginning of the call would result in significant time savings. Such users can be identified by monitoring and tracking the content of calls made by the users in order to recognize user patterns that may be used to create customized interactions. For example, if a user selects an option to hear account balances above a certain threshold (e.g., 85%) of the calls made to the organization, the user may be flagged as a potential candidate for the quick account balance service that provides a customer's account balances immediately after identification and/or authentication of the user.

Once this pattern is identified, the user may be notified (e.g., via e-mail, phone, targeted advertisement.) of an availability of the customized IVR experience (e.g. for quick account balance service). For example, in some embodiments, the notification may occur when the user calls in to the IVR system, via an e-mail, via a text message, or any other method of communication. The user may be asked to enroll or register for the service if the user would like to receive such service. The organization may gather a variety of information from the user during the enrollment process. Examples of such information include, but are not limited to, an identification of the accounts the user chooses to hear the balance of (e.g., savings account, checking account, credit card, car loan, home equity line of credit, or other), an order of the account balances (e.g., "first checking, second savings" or "highest balance first, lowest balance second"), and any other particular preferences the user specifies. This information may also be gathered, in some embodiments, on a website portal, through a mobile application, or through interactions (e.g., voice, dial pad, etc.) with the IVR system.

After gathering this information, the organization may create a customized IVR plan for the user in accordance with the user preferences. When the user calls in after enrolling in the customized IVR service, the customized IVR plan (e.g., quick account balances) may be executed. Thus, after authentication, the user's checking account balance will be stated first, then the user's savings account balance will be stated. After the user's customized IVR plan is executed, the user may be directed to a main menu or reverted back to a typical IVR call scenario.

Prior to asking the user if the user would like to be enrolled in the service, logs may be checked to ensure that the user has not already been asked or enrolled in the service. In addition, some embodiments also track the user's response to previous notifications regarding the service. In some cases, the system may flag when the last notification of the service occurred, if any, and whether the user's call habits have altered. This information can be used to determine (e.g., based on notification rules) whether and when a new notification should be sent. For example, the user may have recently set up an online account. If the user has logged in and checked the account online and decreased the number of calls, then the organization may choose not to send a notification. In some embodiments, the user may have requested a different notification method (e.g., checking an online account to calling for information).

Thus, in some embodiments, a user can elect to hear the balances of one or more of the user's accounts without going through a phone menu or asking a representative to do so. After the user dials into the organization and is authenticated, the organization proactively states the user's account balances without an active request from the customer. In some embodiments, users who may benefit from this service are identified based on the content of the customer's previous or current phone calls to the organization. In some embodiments, the traditional navigational menu may then be presented after completion of the presentation of the customized information. In other embodiments, the user may interrupt the customized informational presentation to access the traditional navigational menu without having to listen to the customized presentation.

The IVR system described herein may further assist with routing customers to the correct representative efficiently by providing a "continue the conversation" service. When a customer calls into an organization, the customer may be asked to provide the subject matter of the call. The customer's answer may not be recognized by the system or interpreted correctly, and the user may be asked to state the subject matter of the call a second time, resulting in a potentially agitated or annoyed customer. Many times, when a customer calls into an organization, the call relates to a previous event or activity the customer has been participating in with the organization. As described herein, when a customer calls into an organization, the organization can make an educated guess of the subject matter of the call by analyzing an event log associated with the user and routing the call to a representative based on the educated guess. Thus, the methods and systems disclosed herein improve the routing efficiency of the calls.

For example, if an event log notes that the user is in the process of filling out an online application for a mortgage when the call is received, the organization may assume that the user is calling about the mortgage application. In some embodiments, the call is directly routed to a representative specializing in mortgage applications. In other embodiments, the user is asked to confirm with a yes or a no answer that the user is calling about a mortgage application (e.g., "Are you calling about a mortgage application?"). In some embodiments, the user is asked to provide a subject matter of the call, but may be provided specific examples of what the call is about based on the event log (e.g., "What are you calling about? For example you can say 'mortgage application.'"). In this way, the user will know what to say and the organization will have a better likelihood of understanding the user's request. Then, the call may be routed to the correct representative, saving valuable time and money for both parties, and, in essence, "continuing the conversation" with the user.

In an example, a user calls into the organization. After being identified (e.g., by a device), and, in some cases, verified (e.g., verifying a PIN), an event log associated with the user is accessed. The event log may include activities or events which the user has participated in with the organization. For example, the event log may document events such as applying for a mortgage, browsing automobile insurance, adding a dependent onto a policy, submitting an insurance claim, and viewing an account.

The events in the event log may be analyzed to determine whether any of the events may relate to the call. Events that are more likely to relate to the call may be events that took place within a proximity to the call or events with a due date scheduled for the day of the call, for example. For example, the event log may note a home owner's insurance claim resolved three months ago and a request to add a dependent onto an automobile policy submitted the day before the call was received. Based on the timeframe and state of the event, the user is likely not calling about the insurance claim. Therefore, the home owner's insurance claim likely does not relate to the call. On the other hand, the call may involve adding the dependent onto the automobile policy due to the proximity in time of the activity to the call.

If any events may relate to the call, a confidence level for the potentially related events may be determined. When the confidence level that the event relates to the call falls within a range or meets or exceeds a threshold, the user may be asked to confirm that the event or subject matter relates to the call. If the user confirms, then the call is directed to the representative in the subject matter area of the event. If the user does not confirm, the user may be asked to provide a subject matter for the call. In some embodiments, when the confidence level that the call relates to the event is extremely high, the call may be directly routed to a representative in the subject matter area of the event without requesting a confirmation from the user.

When the confidence level that the call relates to the event is below a threshold (or falls within a second range) but still may pertain to the call (e.g., the event occurred 25 hours ago), the user may be provided a hint as to the subject matter or event that the call relates to. If the user takes the hint, then the call is directed to a representative in that subject matter. If the user does not take the hint, the call is directed to a representative in a subject matter specified by the user.

The customized IVR service and the continue-the-conversation service may work in coordination with each other. For example, after a user calls and receives information per the customized IVR plan, the user may stay on the phone line to inquire about another topic. If the user stays on the call after the customized IVR plan is executed, the user may be routed to the appropriate representative based on an analysis of the logged events.

In the following description, for the purposes of explanation, numerous specific details are set forth in order to provide a thorough understanding of embodiments of the present disclosure. It will be apparent on reading the disclosure, however, to one skilled in the art that embodiments may be practiced without some of these specific details. Additionally, although examples including customizing a IVR experience for account balances are discussed, systems and methods described may apply to any IVR customization. For example, embodiments of this disclosure may be used to create a customized IVR experience for investment accounts, stock quotes, insurance claims, bill pay, and other services or personal information.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), magnetic or optical cards, flash memory, or any other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device, a mobile phone, a tablet computer, a mobile media device, a wearable computing device, a mobile gaming device, a vehicle-based computer, a dedicated terminal, a public terminal, desktop, or laptop computer, a kiosk, etc.). In some embodiments, applications 105A-105N may be stored on the computing device or may be stored remotely. These computing devices can include mechanisms for receiving and sending traffic by connecting through network 115 to IVR system 120 and data stores 125 and 130. IVR system 120 may include IVR customization platform 135 and IVR routing platform 140.

Computing devices 110A-110M may be configured to communicate via the network 115 with IVR system 120. In some embodiments, computing devices 110A-110M can retrieve or submit information to IVR system 120 and run one or more applications with customized content retrieved by IVR system 120 and data stores 125 and 130. For example, computing devices 110A-110M can execute a browser application or a customized client to enable interaction between the computing devices 110A-110M and IVR system 120, and data stores 125 and 130.

Network 115 can include any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec). In some embodiments, network 115 can also include a plain old telephone (POT) network.

IVR system 120 can be running on one or more servers and may include IVR customization platform 135 and IVR routing platform 140. IVR customization platform 135 may be used to identify candidates for customized IVR service, create customized IVR plans, execute the customized IVR plans, and other activities. IVR routing platform 140 may be used to analyze event logs, determine where to route a call, generate notification, and perform a variety of other activities. IVR system 120 may be communicably coupled with data stores 125 and 130, and computing devices 110A-110M and may communicate, access or receive data (e.g., identification information, tokens, verification information, voice authentication services, etc.) from computing devices 110A-110M, service provider 125, and data stores 125 and 130. IVR system 120 may be associated with a membership organization, and the users may be members or potential members of the membership organization. The organization may be a financial institution and/or an insurance company.

The IVR experience provided by IVR system 120 may be customized and/or routed for callers based on information received through various user interfaces running on computing devices 110A-110M or other interactions, communications, and/or other inputs (e.g., e-mails, tokens, and/or communications via other channels). IVR system 120 can be calibrated/configured by individual companies or service providers based on user needs and/or business objectives. In an example, customized IVR plans and notification rules may vary by company; the customized IVR plans for a financial services company will be different than the customized IVR plans for an airline company.

In some cases, the activities and services performed by IVR system 120 may include a wide range of activities and services. For example, in addition to determining an enrollment status, creating and executing a customization plan, and determining where to route calls, IVR system 120 may be configured to monitor calls and call usage from the callers. A caller profile may be created and used in conjunction with other profiles, scores, and/or business practices to determine whether the user may be interested in enrolling. In some embodiments, IVR system 120 includes various data processing and analytic tools that allow for the monitoring and evaluation of users and user information retrieved from data stores 125 and 130.

The data stores 125 and 130 can be used to manage storage and access to user data such as call history, registered user devices, user identifications, voice profiles, token IDs, financial information, authentication history, user preferences, member identification numbers, device fingerprints, personal identification numbers, customized IVR enrollment status such as quick balance enrollment status, accounts activated for quick balance enrollment status, the period of time in between notifications, a last notification date, and other information. Data stores 125 and 130 may be a data repository of a set of integrated objects that are modeled using classes defined in database schemas. Data stores 125 and 130 may further include flat files that can store data. IVR system 120 and/or other servers may collect and/or access data from the data stores 125 and 130.

Figure 2:
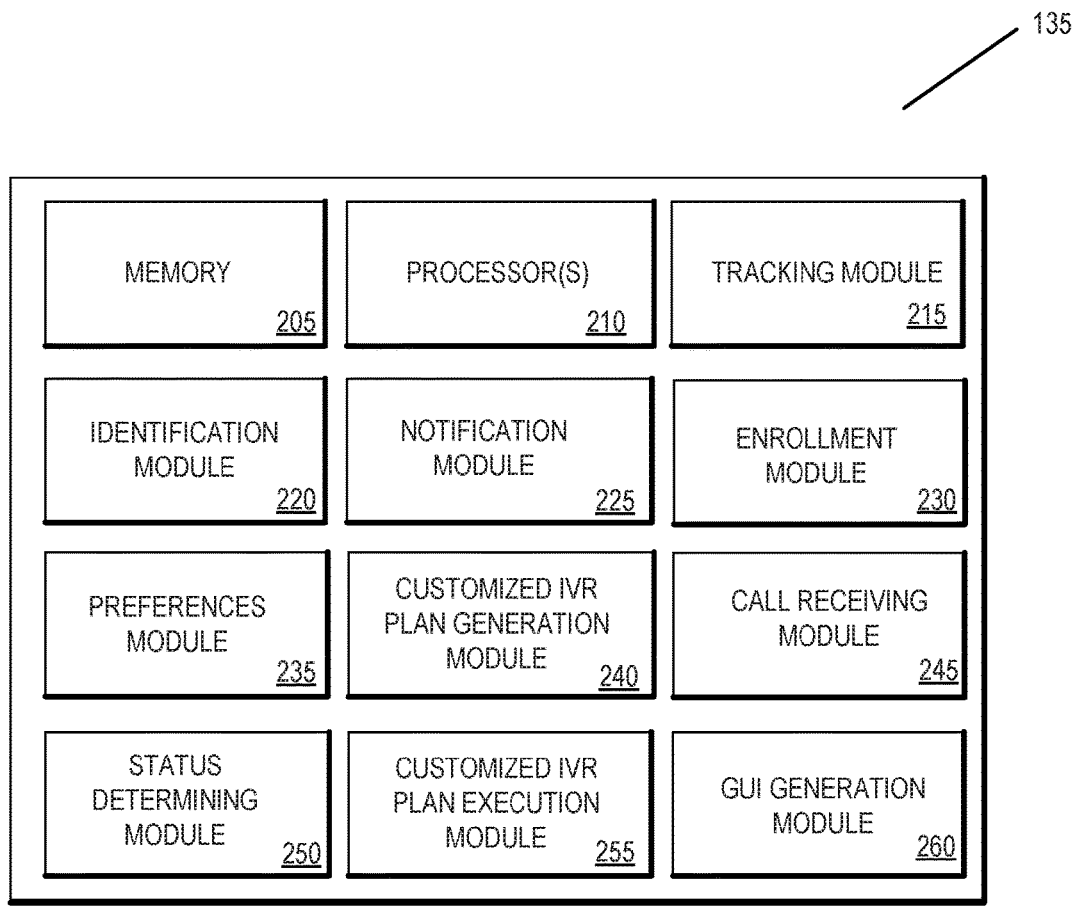
FIG. 2 is a block diagram illustrating components that can be included in an IVR system in accordance with various embodiments of the disclosure.

FIG. 2 is a block diagram illustrating components that can be included in an IVR system such as IVR customization platform 135. According to the embodiments shown in FIG. 2, IVR customization platform 135 may include memory 205, processor(s) 210, tracking module 215, identification module 220, notification module 225, enrollment module 230, preferences module 235, customized IVR plan generation module 240, call receiving module 245, status determining module 250, customized IVR plan execution module 255, and Graphic User Interface (GUI) generation module 260. Other embodiments of the present disclosure may include some, all, or none of these modules and components along with other modules, applications, and/or components. The modules and components illustrated in FIG. 2 may be hardware, firmware, software, or a combination. Some embodiments may incorporate two or more of these modules into a single module and/or associate a portion of the functionality of one or more of these modules with a different module.

Memory 205 can be any device, mechanism, or populated data structure used for storing information. In accordance with some embodiments of the present disclosure, memory 205 can encompass any type of, but is not limited to, volatile memory, nonvolatile memory, and dynamic memory. For example, memory 205 can be random access memory, memory storage devices, optical memory devices, magnetic media, floppy discs, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disc drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of tracking module 215, identification module 220, notification module 225, enrollment module 230, preferences module 235, customized IVR plan generation module 240, call receiving module 245, status determining module 250, customized IVR plan execution module 255, and GUI generation module 260.

Tracking module 215 tracks call history and recent events of the user. In some embodiments, the call history and recent events may be used to determine whether the user should be presented with an enrollment offer of a customized IVR plan. The customized IVR plans may be static (e.g., changed only upon user request) or dynamic (e.g., automatically updated based on call history and recent events). Customized IVR plans may present a variety of information to the user when the user calls in without requiring the user to navigate through an interactive voice response system (IVR) or call menu. The customized IVR plan may be specific to the individual. For example, one caller may wish to hear the caller's account balances. Another customer may wish to hear a status of his investments. Yet another customer may wish to hear a status of her investments as well as the status of her insurance claim.

Call history may include a percentage of calls in which the user has called requesting a specific service, a frequency of calls received from the user, etc. When little or no call-in history for the user is available, demographic data (e.g., call history of others of similar age, familial status, etc.) may be used while call history for the user is established. Recent events may include events that have occurred within a period of time prior to the call or events with an activity scheduled for the time or date of the call (e.g., a closing on a property). Recent events may include the submission of an insurance claim, the request for insurance, the submission of a loan application, etc. Such events may be associated with frequent user call-in. For example, if the user was in a car accident and submitted an insurance claim, until the claim is resolved, the user may want to hear the status of the claim each time the user calls in without having to navigate through an IVR menu.

Tracking module 215 may determine when it is appropriate to extend an enrollment offer to the user for customized IVR service. Determining when an offer should be extended may be based on the call history of the user (e.g., if 80% of the user's calls to the organization request an account balance), and/or recent events that may involve frequent updates are associated with the user (e.g., user submitted an insurance claim). In some cases, tracking module 215 determines the date and time the user was previously asked and the response the user gave and determines whether it would be appropriate to ask the user again on the call. For example, if the user was asked a period of time ago (e.g., six months, one year, etc.), the user may want to reconsider, particularly if circumstances have changed (e.g., the user calls in more often for the same information, a recent event occurred, etc.). Tracking module 215 may provide the enrollment offer information to notification module 225 to notify the user of the offer to enroll in the customized IVR service.

When a call is received from a user via call receiving module 245, identification module 220 may identify the caller. Identification module 220 may identify the user through passive (e.g., without prompting the user) and/or active (e.g., through user prompts) data collection techniques. For example, identification module 220 may identify the calling device and associate the device with a user. In some embodiments, a phone number, IP address, biometric information, facial recognition, or a combination thereof could be used to identify the user. In some embodiments, identification module 220 also verifies the identity of the user. Verifying the identity of the user may include verifying a PIN inserted by the user, analyzing a biometric (e.g., voice biometric), checking the security question answers, verifying a location, etc. In some embodiments, if a phone number is associated with more than one user, than the user may not qualify for customized IVR service.

Notification module 225 may notify the user of an opportunity to enroll in a customized IVR program after receiving an indication from tracking module 215 that the user should be presented with an enrollment offer. The notification may be via a text message, email message, phone call, question at the end of a phone call, or any other method. The notification may specify what type of information the user can receive automatically each time the user calls into the organization (e.g., account balances, insurance claims, etc.).

After notification module 225 notifies the user, enrollment module 230 receives an indication from the user indicating whether the user would like to enroll in the customized IVR service. If the user indicates a desire to be enrolled, enrollment module 225 enrolls the user in the customized IVR service. As part of the enrollment process, enrollment module 225 communicates the enrollment to preferences module 235.

Preferences module 235 may present customized preferences to the user and receive indications of the preferences for the customized IVR service from the user. For example, if the user wishes to hear a summary of the user's account balances, preferences module 235 may present the user with all of the user's accounts and allow the user to select which accounts and in which order the account balances of the accounts should be stated (e.g., type of account, highest balance, etc.). In some embodiments, preferences can be selected online. An example of a user interface for selecting preferences is depicted in FIG. 5. In other embodiments, the user provides preferences during a phone call.

Customized IVR plan generation module 240 may generate a customized IVR plan for the user in accordance with the user preferences. The customized IVR plan may be executed by customized IVR plan execution module 255 upon receiving a phone call from the user via call receiving module 245.

Call receiving module 245 may receive a call from a user. After the call is received, the caller may be identified by identification module 220. Status determining module 250 may determine an enrollment status of the user. If the enrollment status of the user is "not enrolled," then a request may be sent to tracking module 215 to determine whether the user should be extended an enrollment offer. If the enrollment status of the user is "enrolled," then the customized IVR plan execution module 255 executes the customized IVR plan to deliver a customized IVR experience for the user. Delivering a customized IVR experience for the user may include reciting account balances in a specific order, for example, without requiring the user to navigate through a menu.

GUI generation module 260 can generate one or more GUI screens that allow interaction with a user. In at least one embodiment, GUI generation module 260 generates a graphical user interface receiving and/or conveying information to the user. For example, GUI generation module 260 may display the user preferences or the enrollment status of the user.

Figure 3:
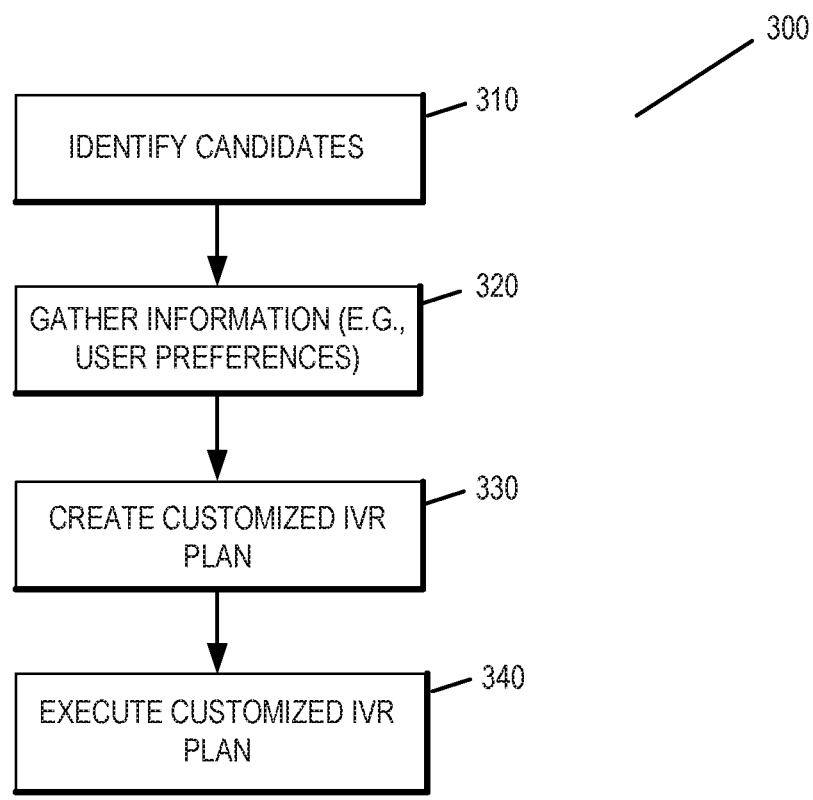
FIG. 3 is a flowchart illustrating a set of operations for executing a customized IVR plan in accordance with various embodiments of the disclosure.

FIG. 3 is a flowchart illustrating a set of operations 300 for executing a customized IVR plan. In some embodiments, fewer than all of the operations are performed, whereas in other embodiments additional operations are performed. In some embodiments, the operations in FIG. 3 can be used in the operations of FIG. 4 and vice versa. Moreover, in some embodiments, the operations may be performed in different orders or in parallel. The operations can be performed by various components in FIG. 2 such as memory 205, processor(s) 210, tracking module 215, identification module 220, notification module 225, enrollment module 230, preferences module 235, customized IVR plan generation module 240, call receiving module 245, status determining module 250, customized IVR plan execution module 255, and GUI generation module 260.

Identifying operation 310 identifies candidates for customized IVR service. The candidates may be identified from a pool of candidates by analyzing call history, recent events, age, and other factors. Gathering operation 320 gathers information to enroll a user in the customized IVR service. For example, gathering operation 320 may collect and create a list of the user's accounts and present the list to the user to select the accounts to be included in the customized IVR service. Gathering operation 320 may receive the user's selections. If the user does not specify preferences but wishes to be enrolled, default preferences may be applied.

Creating operation 330 creates a customized IVR plan for the user in accordance with the user's specified preferences. Executing operation 340 executes the customized IVR plan for the user when a call from the user is received. Executing the customized IVR plan may include reciting a status of one or more accounts proactively (i.e., without requiring the user to navigate through a menu to hear the status).

Figure 4:
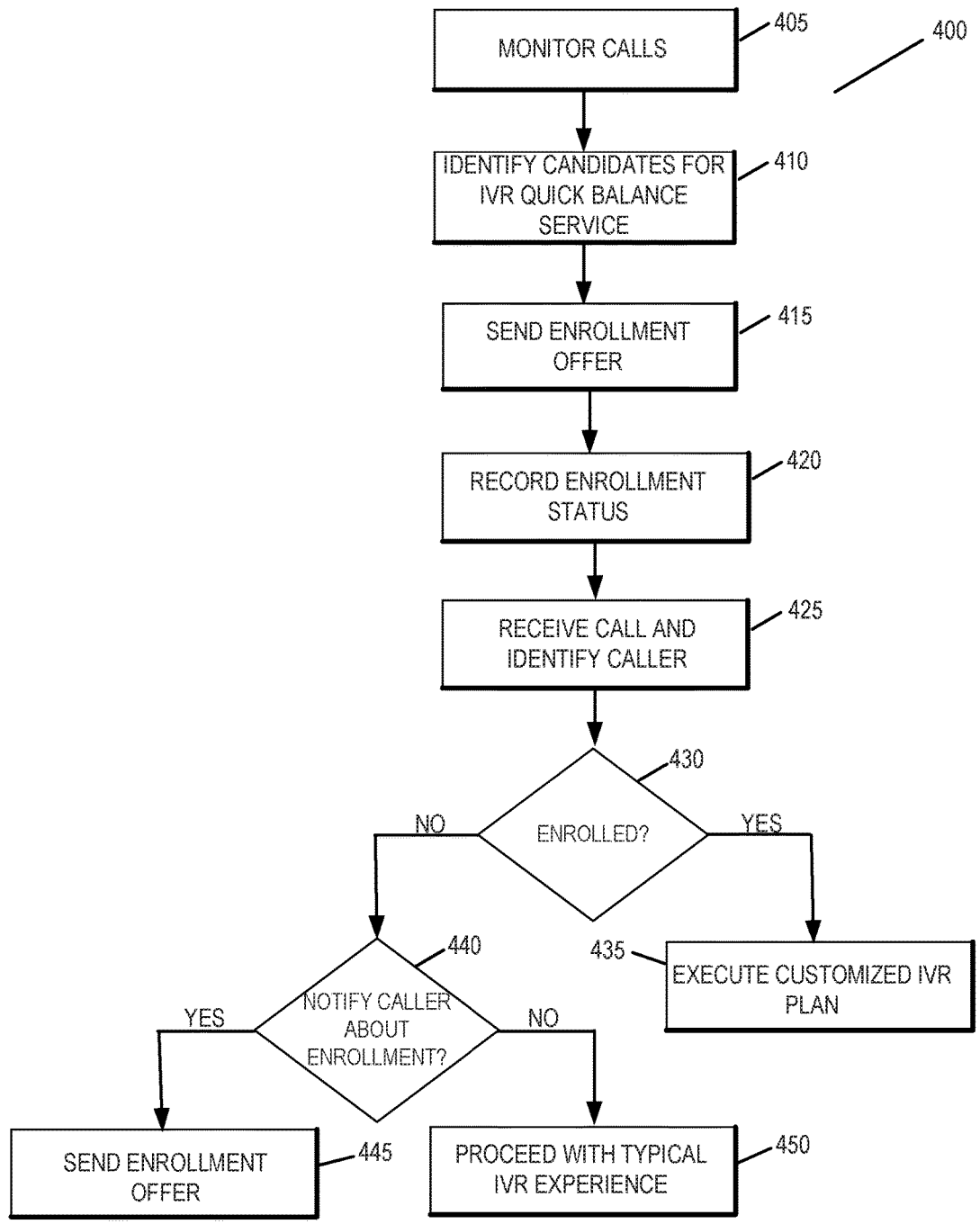
FIG. 4 is a flowchart illustrating a set of operations for enrolling a user in an IVR system and executing a customized IVR plan in accordance with various embodiments of the disclosure.

FIG. 4 is a flowchart illustrating a set of operations 400 for executing a customized IVR plan. In some embodiments, fewer than all of the operations are performed, whereas in other embodiments additional operations are performed. In some embodiments, the operations in FIG. 4 can be used in the operations of FIG. 3 and vice versa. Moreover, in some embodiments, the operations may be performed in different orders or in parallel. The operations can be performed by various components in FIG. 2 such as memory 205, processor(s) 210, tracking module 215, identification module 220, notification module 225, enrollment module 230, preferences module 235, customized IVR plan generation module 240, call receiving module 245, status determining module 250, customized IVR plan execution module 255, and GUI generation module 260.

Monitoring operation 405 monitors calls from users and may create a call history or user profile for the user. Monitoring operation 405 may track frequency of phone calls, content of phone calls (e.g., what the call relates to), online activity (e.g., whether this user has an online account and whether the user uses it). Identifying operation 410 identifies candidates for IVR quick account balance service. The candidates may be identified as candidates by their call history. For example, the candidates may include users who call at least bi-monthly and for whom an account balance was requested during at least 80% of those calls. In some embodiments, users are required to have a unique phone number to qualify as a candidate to protect sensitive data. Users who qualify as candidates are sent or notified of an enrollment offer in sending operation 415. If the user accepts the offer, the user is enrolled in the customized IVR service. If the user chooses not to enroll, the user is not enrolled in the customized IVR service. Either way, the enrollment status for the user is recorded in recording operation 420.

Receiving operation 425 receives a call from a caller and identifies the caller. The caller may be identified based on the device the user is calling from (e.g., phone number, device fingerprint, secure browsing solution, IP address, location, etc.). Decision operation 430 determines whether the caller is enrolled in the customized IVR service. If the user is enrolled, decision operation 430 branches to executing operation 435 that executes a customized IVR plan specific to the user (e.g., recites the status of the user's accounts, outstanding balances) immediately after identification and/or authentication. After the customized IVR plan is executed, the call may be ended or may continue by presenting the user with a menu.

If the user is not enrolled, decision operation 430 branches to decision operation 440 that determines whether to notify the caller with an enrollment offer. The decision may be made by analyzing the call history of the user and determining when the user was last asked, if circumstances have changed, etc. If it is determined that the user should be presented with an enrollment offer, an enrollment offer is sent to the user in sending operation 445. In some embodiments, the enrollment offer is made at the end of the call. If it is determined that the user should not be presented with an enrollment offer, the call proceeds with a typical IVR experience in proceeding operation 450 (e.g., IVR menu requests information from user).

FIG. 5 depicts an example of a user interface 500 that can be used to select preferences in accordance with various embodiments of the disclosure. As shown in FIG. 5, user interface 500 may display the accounts 505 associated with the user. The user may select the accounts for which the user would like the balance read by selecting the accounts and saving the preferences selected by the user. To keep the user's information private, the last four digits of the account number can be represented in the boxes by the account number.

Figure 6:
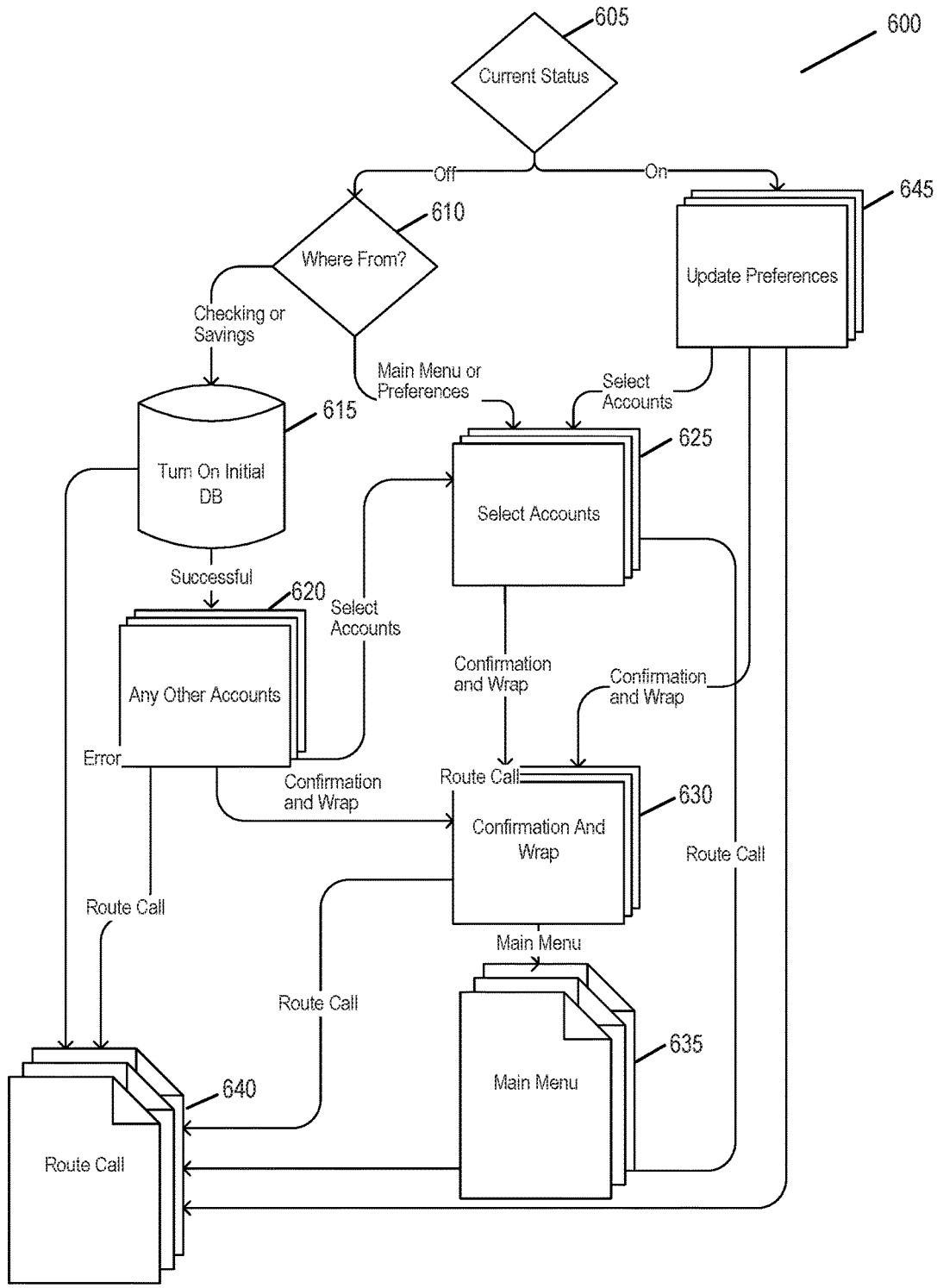
FIG. 6 illustrates an example of a call flow that may be used in connection with an IVR system in accordance with various embodiments of the disclosure.

FIG. 6 illustrates an example of a call flow 600 that may be used in connection with an IVR system. In FIG. 6, the call flow illustrates an example of how the call can be routed to initialize or update a quick account balance service (i.e., a customized IVR service in which account balances are recited). Once a call is received and the user is identified, decision operation 605 determines an enrollment or enablement status for the user.

If the quick account balance service is not enabled, decision operation 605 branches to decision operation 610 that determines the current status of the call (e.g., whether the call is at the checking or savings menu or at the main menu). If the call is at the checking or savings menu, the quick account balance service for the checking or savings account is initialized in initialization operation 615. If the call is at the main menu or the preferences area or menu, the user is asked to select accounts in select accounts operation 625.

Any other accounts operation 620 determines whether there are any additional accounts that could be added to the quick account balance service. If so, the user can select accounts in select accounts operation 625. If there is an error, then the call is routed to routing operation 640 for the user to exit the call. If there are no additional accounts that can be added to the quick account balance service, the call may be routed to confirmation and wrap operation 630. In some cases, the call may be routed from the confirmation and wrap operation 630 to main menu operation 635.

Once the accounts are selected, confirmation and wrap operation 630 confirms the accounts for the quick account balance service and routes the call to main menu operation 635 to hear the main menu or to routing operation 640 to exit the call or to be routed elsewhere in the organization. From the main menu, the call may be routed to routing operation 640 to end the call or to be connected with a representative. Calls can also be routed to a self-service application from Main Menu.

If the quick account balance service is enabled, then the caller can update the preferences for the quick account balance service in preferences operation 645. If the user chooses to select accounts, the call may be routed to select accounts operation 625. If the user does not want to select accounts, the call may be routed to the main menu operation 635 to continue the call or to routing operation 640 to end the call or to be routed elsewhere in the organization.

Figure 7:
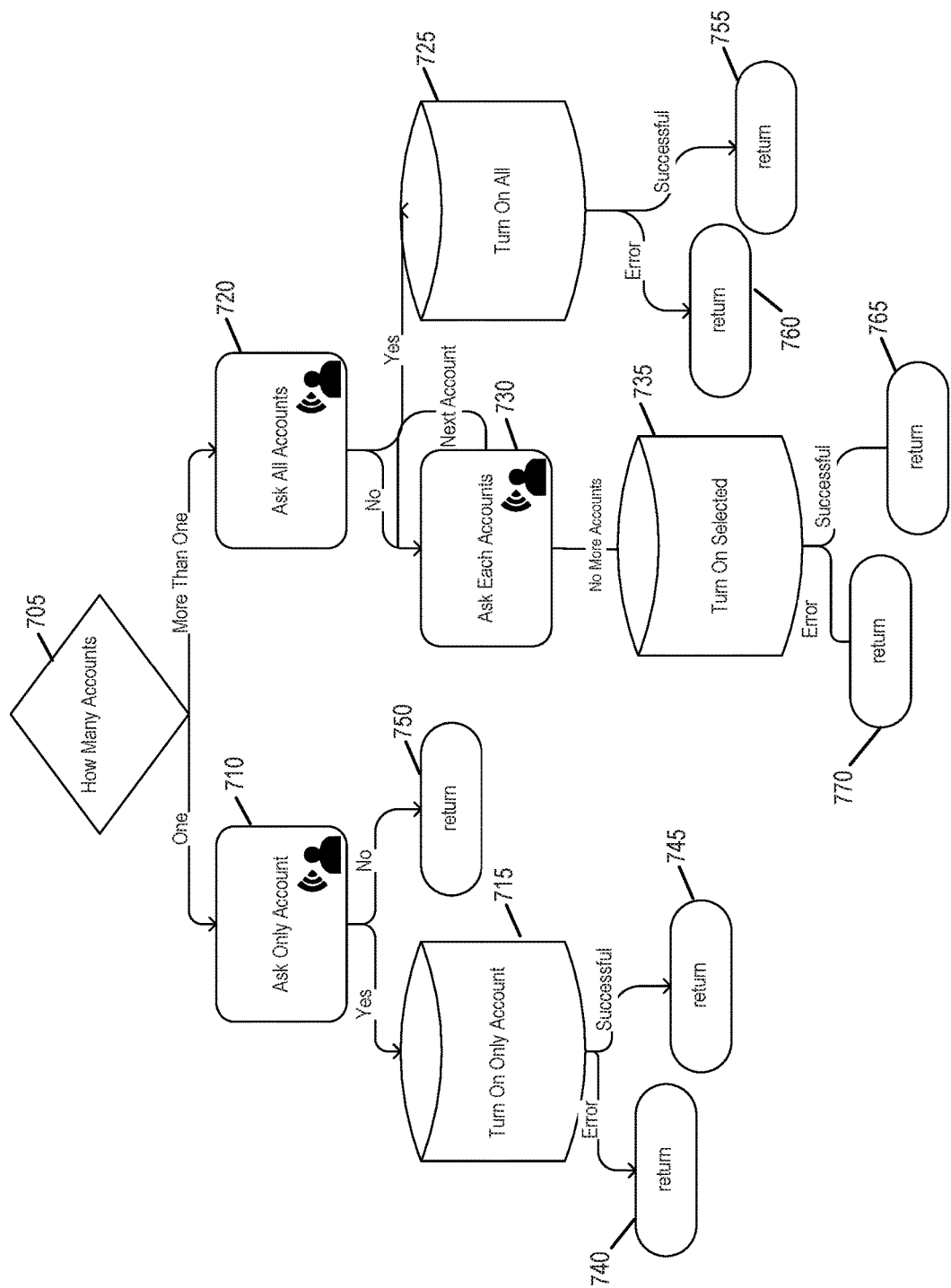
FIG. 7 illustrates an example of a set of operations in a call flow that may be used in connection with an IVR system in accordance with various embodiments of the disclosure.

FIG. 7 illustrates an example of a set of operations for adding other accounts (such as any other accounts operation 620) that may be used in connection with a IVR system. The returns in FIG. 7 are returned to any other accounts operation 620 in FIG. 6.

Determination operation 705 determines the number of accounts associated with the user. If determination operation 705 determines that the user has only one account, determination operation 705 branches to single account operation 710 that asks the user if the user would like to turn on the quick account balance service for the account. If the user responds with yes, the quick account balance service is initialized for the account in initialization operation 715. If initialization operation 715 results in an error, return operation 740 returns the call to any other accounts operation 620. If initialization operation 715 is successful, the call is returned to any other accounts operation 620 in return operation 745. If the user responds with no, single account operation 710 records that the quick account balance service is not initialized for the account, and the call is returned to any other accounts operation 620 in return operation 750.

If determination operation 705 detects more than one account associated with the user, then determination operation 705 branches to query operation 720 where the user is asked whether the user would like to initialize the quick account balance service for all of the user's accounts. If the user responds with yes in response to query operation 720, then the quick account balance service is initialized for all of the accounts in activation operation 725. If the activation is successful, the call is returned to any other accounts operation 620 via return operation 755. If the activation is unsuccessful, the call is returned to any other accounts operation 620 via return operation 760. If the user responds with no in response to query operation 720, then the user is asked separately for each account whether the quick account balance service should be enabled during individual selection operation 730. Once individual selection operation 730 is complete (i.e., there are no more accounts left), then individual selection operation 730 branches to activation operation 735 where the quick account balance service is initialized for each account that the user responded with yes during individual selection operation 730. If the selected accounts are successfully turned on, return operation 765 returns the call to any other accounts operation 620. If the selected accounts are not successfully turned on resulting in an error, return operation 770 returns the call to any other accounts operation 620. In some embodiments, the accounts are analyzed for errors or success on a per-account basis.

Figure 8:
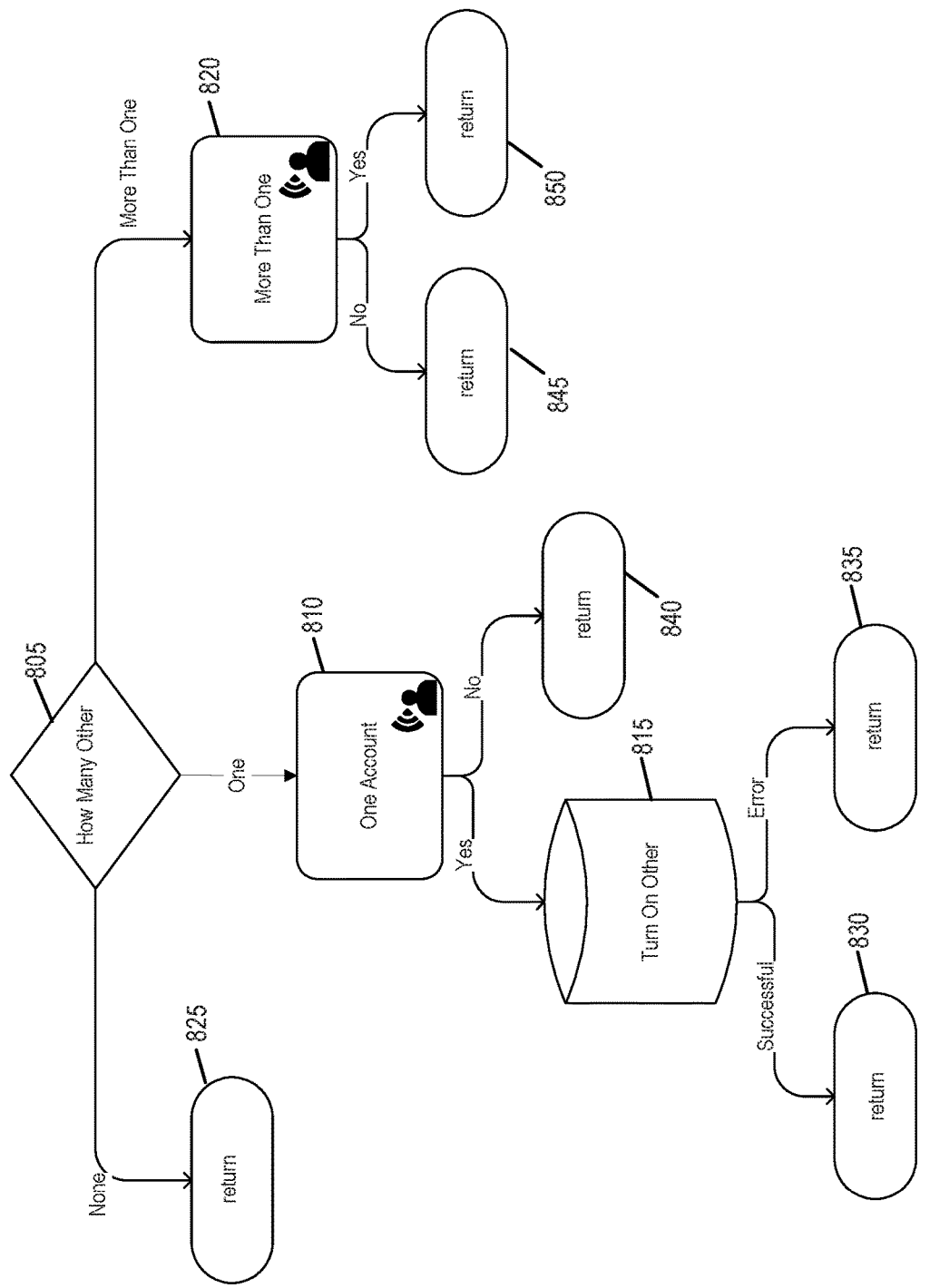
FIG. 8 illustrates an example of a set of operations in a call flow that may be used in connection with an IVR system in accordance with various embodiments of the disclosure.

FIG. 8 illustrates an example of a set of operations for selecting accounts such as select accounts operation 625 that may be used in connection with an IVR system. The returns in FIG. 8 are returned to select accounts operation 625 in FIG. 6. Decision operation 805 determines how many additional accounts are available to add to the quick account balance service. If there are none, decision operation 805 branches to return operation 825 to return the call to select accounts operation 625. If there is one account to be added, the user is asked whether the user would like the account added in one account operation 810. If the user responds with yes, then the account is added to the quick account balance service in activation operation 815. If adding the account is successful, then return operation 830 returns the call to select accounts operation 625. If adding the account is unsuccessful, then return operation 835 returns the call to select accounts operation 625. If the user responds with no to adding in the account, then the account is not added to the quick account balance service, and return operation 840 returns the call to select accounts operation 625.

If more than one account is detected, then the user is asked whether the other accounts should be added to the quick account balance service in adding accounts operation 820. If the user does not wish to add the additional accounts, then return operation 845 returns the call to select accounts operation 625. If the user wants to add additional accounts, then return operation 850 returns the call to select accounts operation 625.

Figure 9:
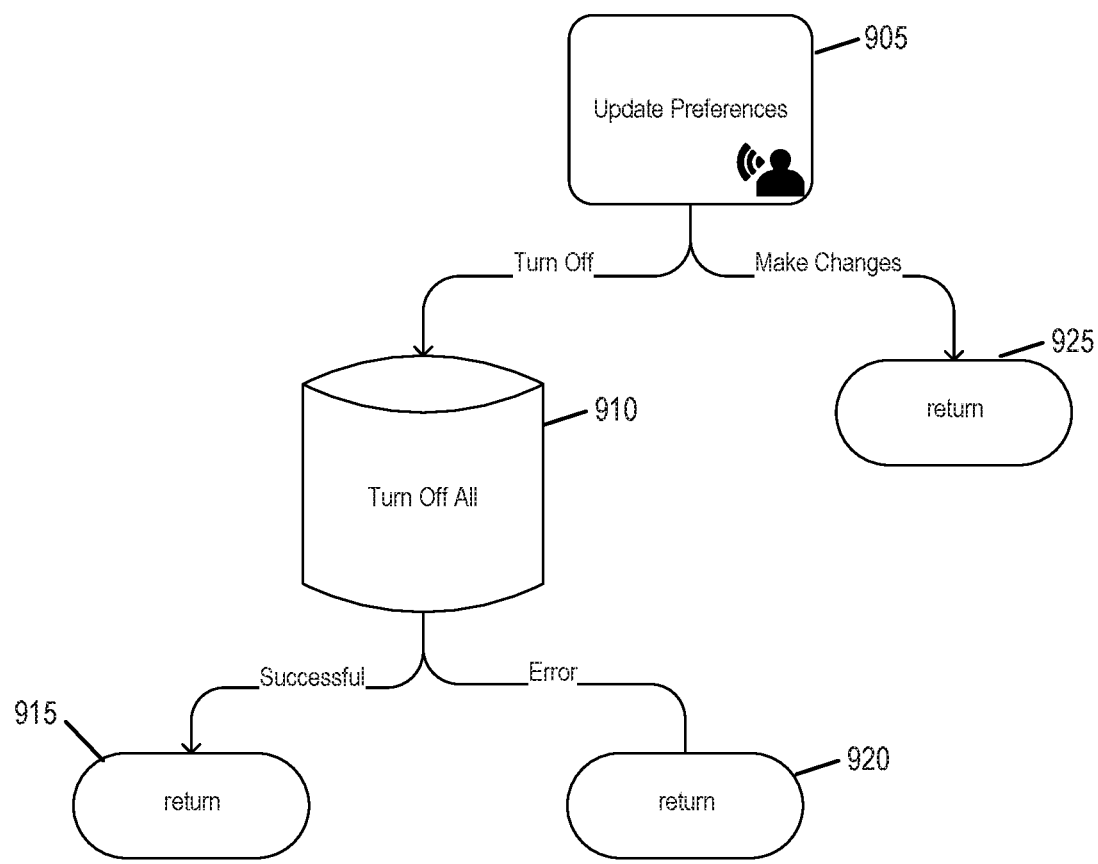
FIG. 9 illustrates an example of a set of operations in a call flow that may be used in connection with an IVR system in accordance with various embodiments of the disclosure.

FIG. 9 illustrates an example of a set of operations for updating preferences such as preferences operation 645 that may be used in connection with an IVR system. The returns in FIG. 9 are returned to preferences operation 645 in FIG. 6. In updating preferences operation 905, the user is asked whether the user would like to turn off the quick account balance service for all of their accounts. If the user responds with yes, turn off operation 910 turns off the quick account balance service. If turn off operation 910 is successful, return operation 915 returns the call to preferences operation 645. If turn off operation 910 is unsuccessful, return operation 920 returns the call to preferences operation 645. If the user chooses to update preferences in updating preferences operation 905, the changes are made, and return operation 925 returns the call to preferences operation 645.

Figure 10:
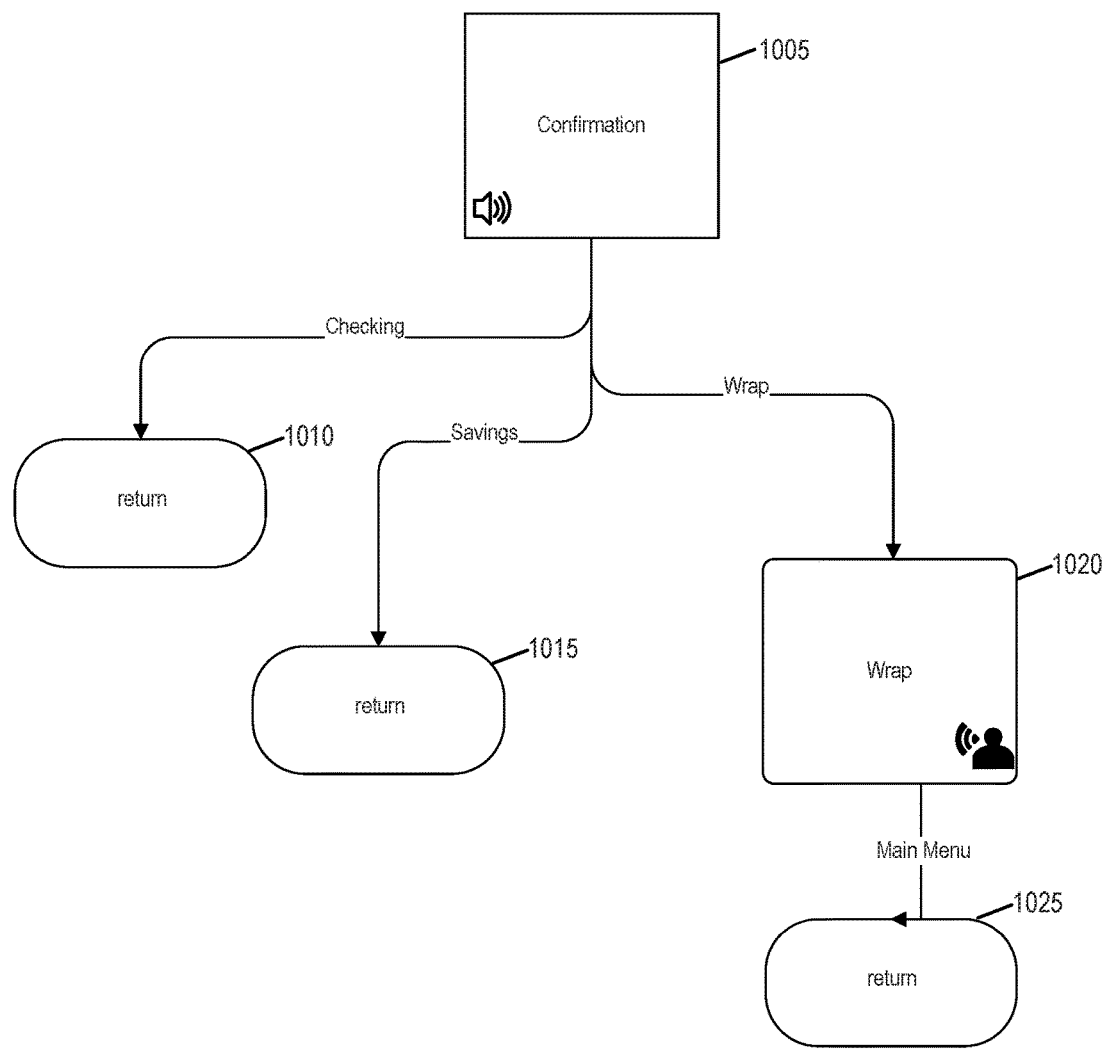
FIG. 10 illustrates an example of a set of operations in a call flow that may be used in connection with an IVR system in accordance with various embodiments of the disclosure.

FIG. 10 illustrates an example of a set of operations for confirming and wrapping up such as confirmation and wrap operation 630 that may be used in connection with an IVR system. The returns in FIG. 10 are returned to confirmation and wrap operation 630 in FIG. 6. In confirmation operation 1005, the user is asked to confirm the selections for the quick account balance service. If the user had selected the checking account for the quick account balance service, return operation 1010 returns the call to confirmation and wrap operation 630. If the user had selected the savings account for the quick account balance service, return operation 1015 returns the call to confirmation and wrap operation 630. If the selections are confirmed, wrap operation 1020 wraps up the quick account balance service selections. The call is directed to a main menu, and return operation 1025 returns the call to confirmation and wrap operation 630.

Figure 11:
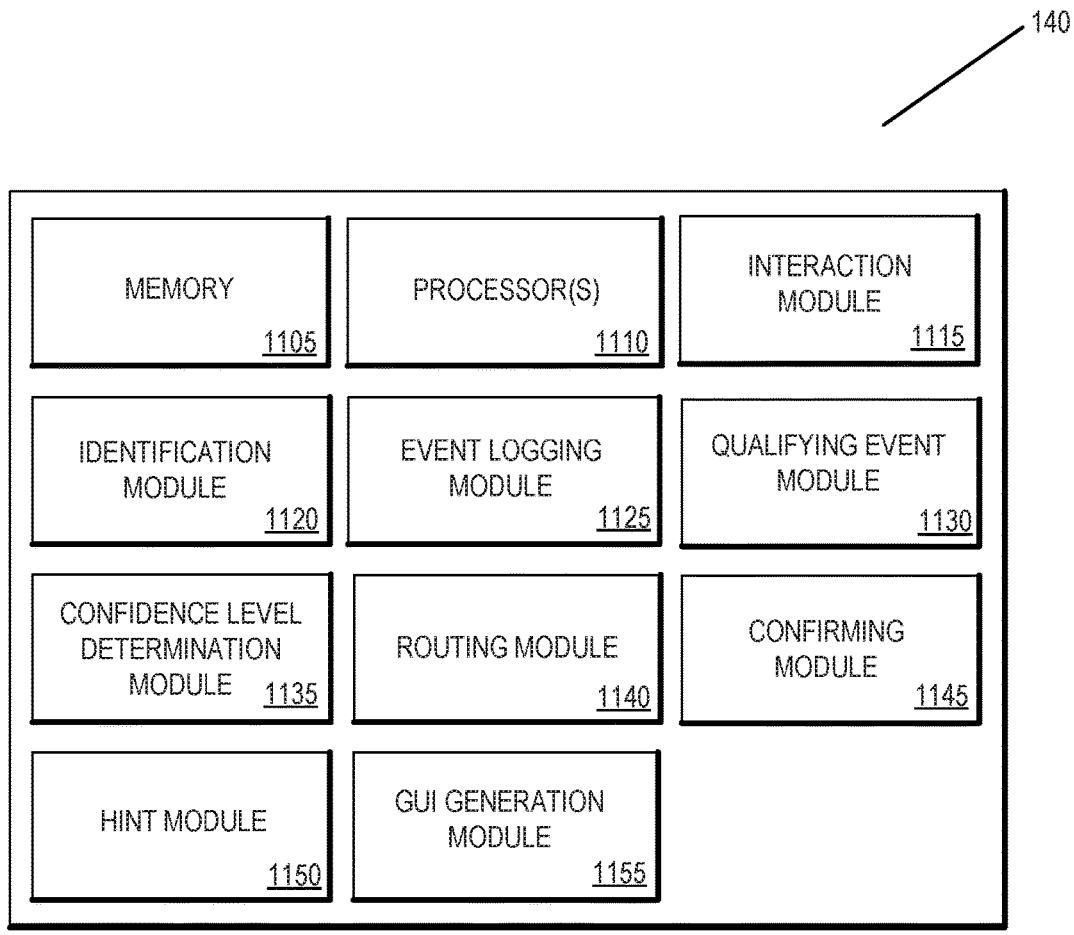
FIG. 11 is a block diagram illustrating components that can be included in an IVR system in accordance with various embodiments of the disclosure.

FIG. 11 illustrates an example of components that may be included in an IVR system such as IVR routing platform 140. In some embodiments, the functionality of the components of IVR system 120 described with respect to FIG. 2 may be included in one or more components of the IVR system 120 described with respect to FIG. 11. According to the embodiments shown in FIG. 11, IVR system 120 may include memory 1105, processor(s) 1110, interaction module 1115, identification module 1120, event logging module 1125, qualifying event module 1130, confidence level determination module 1135, routing module 1140, confirming module 1145, hint module 1150, and GUI generation module 1155. Other embodiments of the present disclosure may include some, all, or none of these modules and components along with other modules, applications, and/or components. The modules and components illustrated in FIG. 11 may be hardware, firmware, software, or a combination. Some embodiments may incorporate two or more of these modules into a single module and/or associate a portion of the functionality of one or more of these modules with a different module.

Memory 1105 can be any device, mechanism, or populated data structure used for storing information as described above for memory 205. Memory 1105 may be used to store instructions for running one or more applications or modules on processor(s) 1110. For example, memory 1105 could be used in one or more embodiments to house all or some of the instructions needed to execute the functionality of interaction module 1115, identification module 1120, event logging module 1125, qualifying event module 1130, confidence level determination module 1135, routing module 1140, confirming module 1145, hint module 1150, and GUI generation module 1155.

Interaction module 1115 may interact with a user via various channels (e.g., IVR, web portal, mobile application, text message, etc.) using various devices (e.g., mobile phone, laptop, tablet, desktop, landline phone, kiosk, etc.). During the interaction, one or more events may take place. For example, the user may browse for a car, apply for a loan, check account statuses, submit an insurance claim, add a dependent onto a policy, etc. Upon detecting an interaction, identification module 1120 identifies the user. Identification module 1120 may identify the user as described above for identification module 220. Once the user is identified, events received during the interactions can be logged by event logging module 1125 in a user profile.

After receiving a call by interaction module 1115, qualifying event module 1130 determines events which may indicate the subject matter of the call. Events that may indicate the subject matter of the call include events that occurred within a specific time prior to the phone call (e.g., 24 hours), events that indicate an activity is taking place today (e.g., a closing on a house), or other events. For example, if the user was online filling out a mortgage application with the organization and the user calls ten minutes later, then the event of filling out a mortgage application likely indicates the subject matter of the user's call. Thus, filling out the mortgage application may be a "qualified" event.

Confidence level determination module 1135 may determine a confidence level that the call relates to the qualified event. The confidence level may be determined based on proximity in time of the event to the call, a number of failed login attempts, or other factors. A confidence level above or at a certain threshold indicates that the call is very likely related to the qualified event. A confidence level below the threshold indicates that the call may be related to the qualified event but may be calling in regard to something different. In some embodiments, if there are two qualified events, the confidence level for both the events may be below the threshold. When there are no qualifying events, then no confidence level is calculated or the confidence level is zero, requiring the user to specify the subject matter of the call.

Routing module 1140 can route the call based on the confidence level received from confidence level determination module 1135. If the confidence level is at or above the threshold, the call may be routed to confirming module 1145 to confirm that the user is calling in regards to the qualified event. If the confidence level is below the threshold, the caller may be given a hint to see if the qualified event (or events) is the subject of the call. The call will then be routed in accordance with the confirmed, stated or selected subject matter. In some embodiments, if the confidence level is at an extremely high level of certainty, the caller may be routed directly to a representative who specializes in the subject matter of the qualified event without receiving verification from a hint or receiving a confirmation from the user. This may occur, for example, if the user calls while concurrently working on a loan application. If no qualifying events are determined, then the caller may be asked to state or select the subject matter of the call.

Confirming module 1145 receives a qualified event at or above the confidence threshold from the routing module 1040 and asks the user, in a yes or no manner, whether the user is calling in regard to the qualified event. For example, if the user was filling out a loan application ten minutes prior to calling, when the user calls in and is identified, the user may be asked, "Are you calling about a loan application?" If the user confirms that the user is calling in regard to the loan application, the call is routed to a representative specializing in loan applications. If the user responds that the user is not calling in regards to a loan application, the user is asked to specify a subject matter of the call.

Hint module 1150 receives a qualified event below the confidence threshold from routing module 1140 and provides a hint of the subject matter to the user. For example, if the user was filling out a loan application 72 hours prior to the call, the loan application may relate to the call, but may score a confidence level below the threshold because of the time lag between the event and the call. Thus, the user may be asked, "What are you calling about? For example, you can state 'loan application' or 'mortgage.'" In this manner, if the qualified event relates to the call, the user will be able to quickly verify the subject matter. In some embodiments two qualifying events are identified. In this case, the hint may state two events for the user, requesting the user to select a subject. If the user does not verify either of the events in the hint, the user may be asked to identify a subject matter of the user's call.

GUI generation module 1155 can generate one or more GUI screens that allow for interaction with a user. In at least one embodiment, GUI generation module 1155 generates a graphical user interface receiving and/or conveying information to the user. In some embodiments, a current activity or qualified event of the user may be displayed on a screen of the representative.

Figure 12:
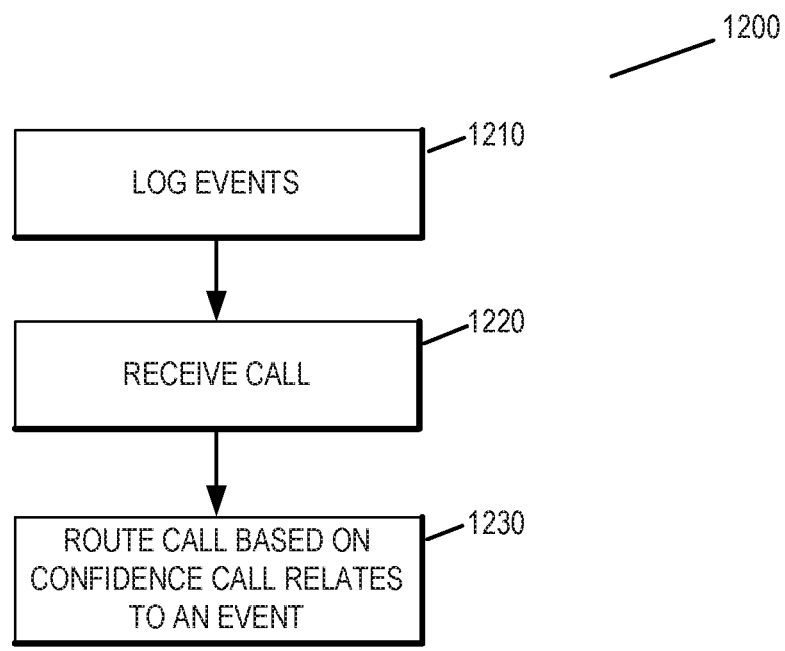
FIG. 12 is a flowchart illustrating a set of operations for call routing that may be used in accordance with various embodiments of the disclosure.

FIG. 12 is a flowchart illustrating a set of operations 1200 for executing a customized IVR plan. In some embodiments, fewer than all of the operations are performed, whereas in other embodiments additional operations are performed. In some embodiments, the operations in FIG. 12 can be used in the operations of FIG. 13 and vice versa. Moreover, in some embodiments, the operations may be performed in different orders or in parallel. The operations can be performed by various components in FIG. 11 such as memory 1105, processor(s) 1110, interaction module 1115, identification module 1120, event logging module 1125, qualifying event module 1130, confidence level determination module 1135, routing module 1140, confirming module 1145, hint module 1150, and GUI generation module 1155.

Logging events operation 1210 logs events from interactions with the user. Interactions may include applying for a loan, purchasing insurance, etc. Receiving operation 1220 receives a call from a user. After the user is identified and, in some cases, verified, the user's call is routed to a representative based on events that were logged in routing operation 1230. In some cases, the user is asked to confirm or verify the subject of the call. In other embodiments, the call is routed directly to a representative specializing in the subject matter of an event the user is likely calling about.

Figure 13:
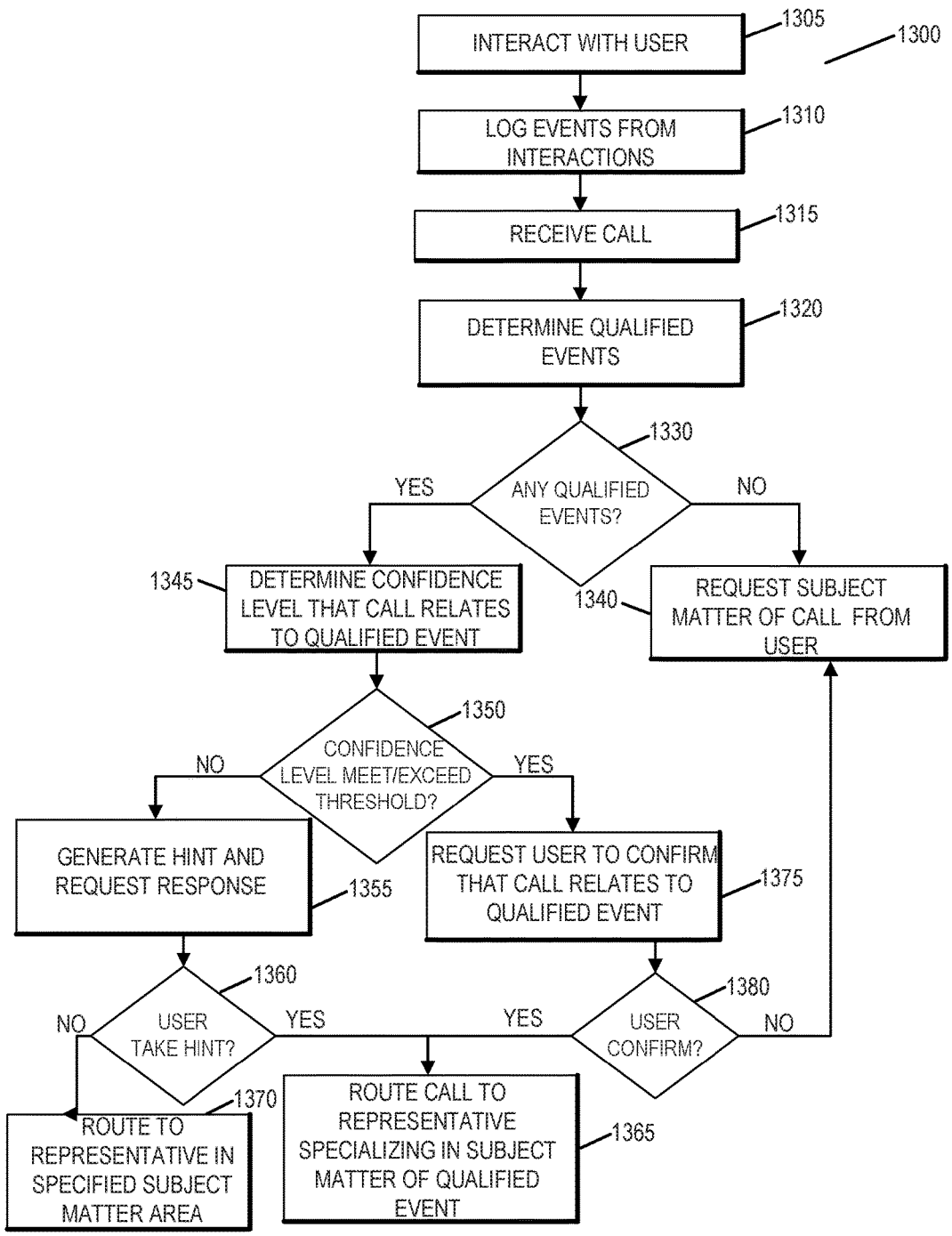
FIG. 13 is a flowchart illustrating a set of operations for routing calls based on qualified events in accordance with various embodiments of the disclosure.

FIG. 13 is a flowchart illustrating a set of operations 1300 for executing a customized IVR plan. In some embodiments, fewer than all of the operations are performed, whereas in other embodiments additional operations are performed. In some embodiments, the operations in FIG. 13 can be used in the operations of FIG. 12 and vice versa. Moreover, in some embodiments, the operations may be performed in different orders or in parallel. The operations can be performed by various components in FIG. 11 such as memory 1105, processor(s) 1110, interaction module 1115, identification module 1120, event logging module 1125, qualifying event module 1130, confidence level determination module 1135, routing module 1140, confirming module 1145, hint module 1150, and GUI generation module 1155.

Interacting operation 1305 interacts with a user. The interactions may result in events associated with the user. For example, the user may have viewed an account, traded stocks, purchased insurance, paid off a loan, etc. The interactions may be conducted through one or more channels (e.g., a web portal, mobile application) over a network (e.g., landline, wireless network) using any type of device (e.g., phone, desktop, laptop, kiosk).

Logging events operation 1310 identifies and logs events in a profile of the user. Receiving operation 1315 receives a call from a user. After the user is identified (e.g., by phone number), and, in some cases, verified, determining operation 1320 determines events that may indicate the subject matter of the current call so the call can be routed more efficiently. Events that may indicate the subject matter of the call (i.e., qualified events) may include events that occurred within a certain time period before the call was received or simultaneously with the call, events in which the user has previously called about, events scheduled to occur on the day or at the time of the call, etc.

Decision block 1330 determines whether there are any qualified events. If there are no qualified events, a user is requested to state or select the subject matter of the call so the user can be routed to the correct representative in requesting operation 1340. If there is one or more qualified events, determining confidence level operation 1345 determines the confidence level that the qualified event is related to the call. The confidence level may be determined by the proximity of the call to the event. Decision operation 1350 determines whether the confidence level that the qualified event is related to the call meets or exceeds a threshold.

If the confidence level does not meet or exceed the threshold, then the user may be asked to state or select the subject matter of the user's call, along with a hint that specifies the qualified event in generating operation 1355 (e.g., "Please tell me what you are calling about. For example, you can say 'loan application.'"). If the user takes the hint in decision operation 1360, the call is routed to a representative specializing in the subject matter of the qualified event in routing operation 1365. If the user does not take the hint, the call is routed to the subject matter that the user states or the user is asked to repeat or modify the indication of the call in routing operation 1370.

If the confidence level meets or exceeds the threshold, then the user may simply be asked to confirm that the user is calling about the qualified event (e.g., yes or no question) in requesting confirmation operation 1375. Decision operation 1380 determines whether the user confirmed that the call relates to the qualified event. If the call relates to the qualified event, then the call is routed to the representative specializing in the subject matter of the qualified event in routing operation 1365. If the call does not relate to the qualified event, then the user is requested to indicate the subject matter of the call in requesting subject matter operation 1340. In some embodiments, when the confidence level is high, the user may not be asked to confirm before being routed to the representative specializing in the subject matter of the qualified event.

Figure 14:
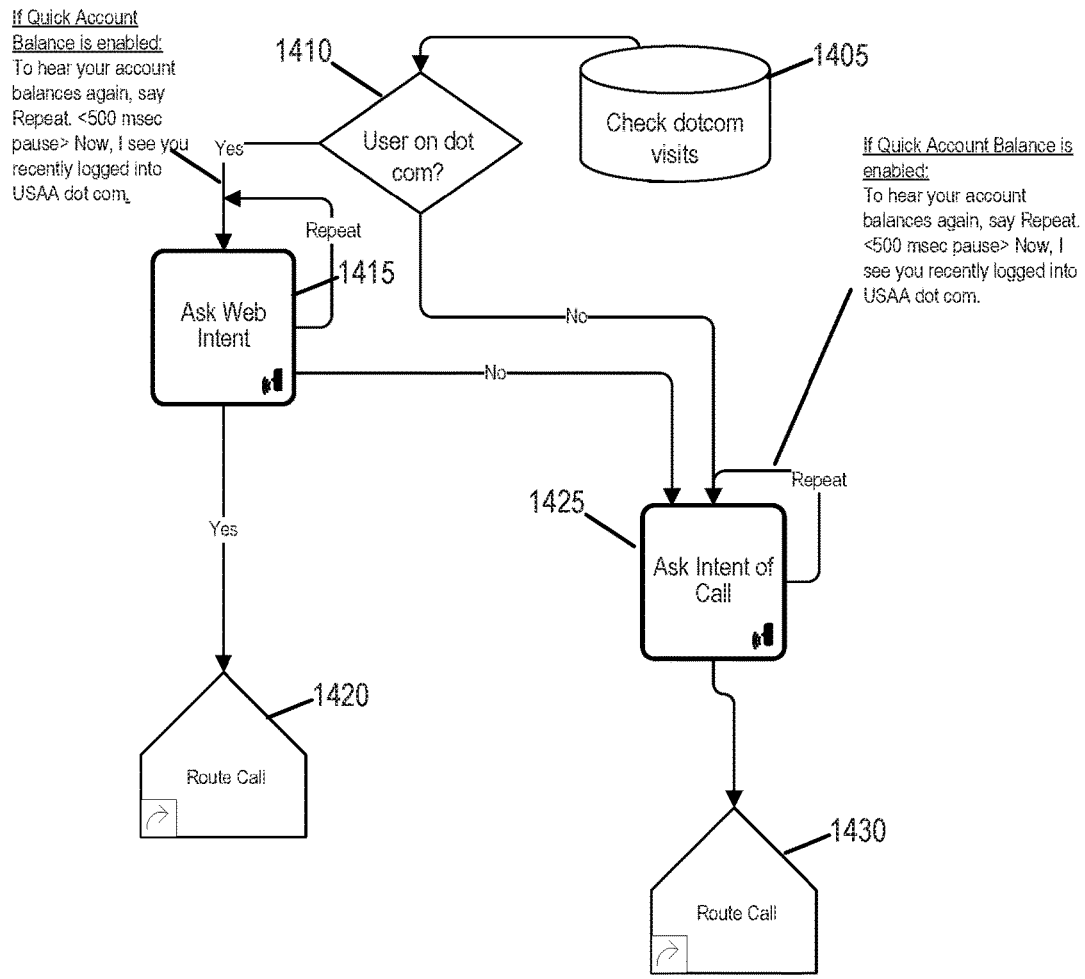
FIG. 14 illustrates an example of a call flow that may be used in connection with an IVR system.

FIG. 14 illustrates an example of a call flow that may be used in connection with an IVR system. When a call is received, check dotcom operation 1405 checks whether the user has logged into or used an affiliated or organization-owned website with in a period of time (e.g., past 24 hours). Decision operation 1410 branches to ask web intent operation 1415 if decision operation 1410 determines that the user has accessed the website within a certain period of time. Ask web intent operation 1415 asks the user whether the user is calling about a specific activity noted from the website activity (e.g., "Are you calling about your automobile insurance?"). Prior to asking the user about the user's intent for calling, the user will hear the user's account balances if the user has enabled the quick account balance service. The user can ask to have the account balances repeated.

If the user answers yes indicating that the call is related to the website activity, the call is routed to a representative specializing in the subject matter of the call in routing operation 1420. In some embodiments, if the intent of the call (i.e., subject of the web access) is a particular topic such as homeowner's insurance or a home acquisition, the user may have to answer additional questions (e.g., which state the user is located in) so that the correct representative can be reached. If the user answers no indicating that the call is not related to the website activity, the call is routed to asking intent operation 1425. The user may be asked to briefly describe what the user is calling about (e.g., "Briefly describe what you are calling about. For example, you can say "I want to change my address."). After the user answers, the call may be routed to an appropriate representative in routing operation 1430.

If decision operation 1410 determines that user did not access the website within a certain period of time (or accessed an irrelevant page), decision operation 1410 branches to asking intent operation 1430, where the user is asked to state the intent of the call. Prior to the user being asked to state the intent of the call, the user may hear the user's account balances if the user has enabled the quick account balance service. The call may then be routed to the correct representative in routing operation 1430.

Computer System Overview

Figure 15:
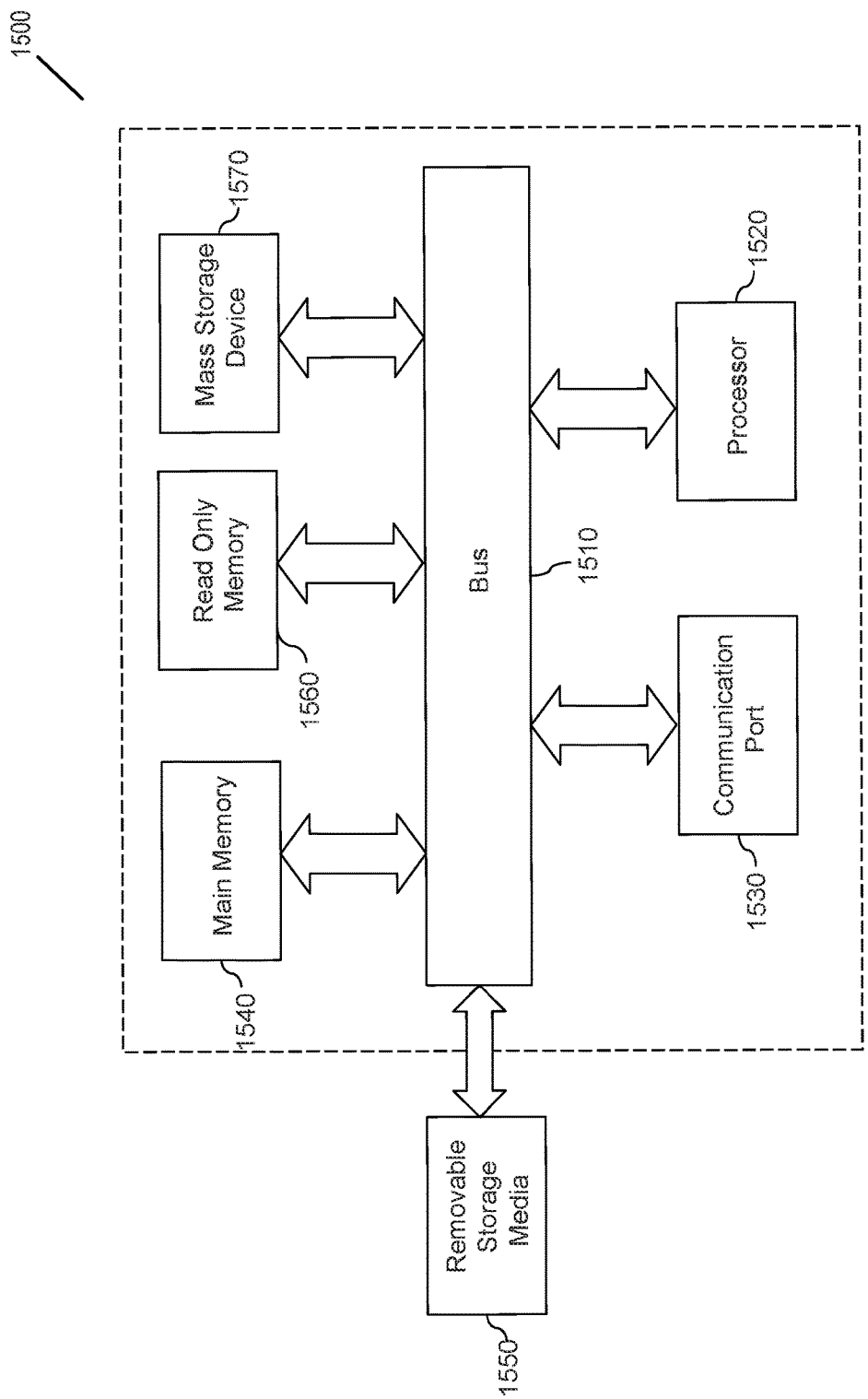
FIG. 15 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 15 is an example of a computer system 1500 with which embodiments of the present disclosure may be utilized. According to the present example, the computer system includes a bus 1510, at least one processor 1520, at least one communication port 1530, a main memory 1540, a removable storage media 1550, a read only memory 1560, and a mass storage 1570.

Processor(s) 1520 can be any known processor, such as, but not limited to, an Intel® Itanium® or Itanium 2® processor(s), or AMD® Opteron® or Athlon MP® processor(s), or Motorola® lines of processors. Communication port(s) 1530 can be any kind of an RS-232 port for use with a modem-based dial-up connection, a 10/100 Ethernet port, or a Gigabit port using copper or fiber. Communication port(s) 1530 may be chosen depending on a network such a Local Area Network (LAN), Wide Area Network (WAN), or any network to which the computer system 1500 connects.

Main memory 1540 can be Random Access Memory (RAM) or any other dynamic storage device(s) commonly known in the art. Read only memory 1560 can be any static storage device(s) such as Programmable Read Only Memory (PROM) chips for storing static information such as instructions for processor 1520.

Mass storage 1570 can be used to store information and instructions. For example, hard discs such as the Adaptec® family of SCSI drives, an optical disc, an array of discs such as RAID, such as the Adaptec family of RAID drives, or any other mass storage devices may be used.

Bus 1510 communicatively couples processor(s) 1520 with the other memory, storage, and communication blocks. Bus 1510 can be a PCI/PCI-X or SCSI based system bus depending on the storage devices used.

Removable storage media 1550 can be any kind of external hard-drives, floppy drives, (OMEGA® Zip Drives, Compact Disc-Read Only Memory (CD-ROM), Compact Disc-Re-Writable (CD-RW), or Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communication between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for creating and executing customized IVR plans and automatically routing calls. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computer-implemented method comprising:
   receiving, at an Interactive Voice Response (IVR) system, a call from a caller;
   determining, at the IVR system, an enrollment status in a quick account balance service of the caller;
   wherein when the enrollment status indicates a status of not enrolled:
      determining a time period between a date of the call and a date that the caller was previously presented with the enrollment offer;
      when the time period is longer than the enrollment offer wait time period:
         presenting, by the IVR system, an enrollment offer for the quick account balance service to the caller, wherein the enrollment offer includes a customized selection of quick account balance preferences associated with the caller;
         receiving, from the caller, selections of quick account balance preferences; and
         enrolling the caller in the quick account balance service by generating a customized IVR plan based on the selections of the quick account balance preferences.

2. The computer-implemented method of claim 1, wherein when the enrollment status indicates a status of enrolled, the computer-implemented method further comprises executing the customized IVR plan to deliver a customized IVR experience.

3. The computer-implemented method of claim 2, wherein the quick account balance preferences comprise an identification of one or more accounts and an order of the one or more identified accounts, wherein delivering the customized IVR experience comprises reciting a balance of the one or more identified accounts in the order identified in the quick account balance preferences without requiring the caller to make a request.

4. The computer-implemented method of claim 3, wherein the order of the one or more identified accounts is an order based on one or more of: types of the one or more identified accounts, or available balances of the one or more identified accounts.

5. The computer-implemented method of claim 1, further comprising identifying the caller, wherein identifying the caller includes:
   identifying a phone number of a device used to make the call; and
   associating the phone number with a profile of the caller.

6. The computer-implemented method of claim 1, wherein the quick account balance preferences are received via a website portal.

7. A computer-implemented method comprising:
   identifying, by an Interactive Voice Response (IVR) system, a caller as a candidate for a customized IVR plan based on a recent event or a call history;
   receiving a call from the caller;
   determining a time period between a date of the call and a date that the caller was previously presented with an enrollment offer;
   presenting the enrollment offer to the caller when the time period is longer than an enrollment offer wait time period;
   gathering information, via a network, to create the customized IVR plan, wherein the customized IVR plan presents a status of at least one account of the caller; and
   executing, by the IVR system, the customized IVR plan proactively when a subsequent call from the caller is received.

8. The computer-implemented method of claim 7, wherein identifying the caller as the candidate for the customized IVR plan comprises detecting a pattern in the call history of the caller.

9. The computer-implemented method of claim 7, wherein identifying the caller as the candidate for the customized IVR plan comprises detecting that the recent event is associated with frequent customer call-ins, wherein the customized IVR plan comprises presenting a status of the recent event when the subsequent call from the caller is received.

10. The computer-implemented method of claim 9, wherein the recent event is an insurance claim.

11. The computer-implemented method of claim 7, wherein gathering the information to create the customized IVR plan comprises receiving user preferences from a user.

12. The computer-implemented method of claim 11, wherein the customized IVR plan is a quick account balance service, wherein executing, by the processor, the customized IVR plan comprises reciting account balances in accordance with the user preferences.

13. A non-transitory computer-readable storage medium containing a set of instructions that, when executed by one or more processors, cause a machine to:
- identify, by an Interactive Voice Response (IVR) system, a caller as a candidate for a customized IVR plan based on a recent event or a call history;
- receive a call from the caller;
- determine a time period between a date of the call and a date that the caller was previously presented with an enrollment offer;
- present the enrollment offer to the caller when the time period is longer than an enrollment offer wait time period;
- gather information, via a network, to create the customized IVR plan, wherein the customized IVR plan presents a status of at least one account of the caller; and
- execute, by the IVR system, the customized IVR plan proactively when a subsequent call from the caller is received.

14. The non-transitory computer-readable storage medium of claim 13, wherein the instructions, that when executed by the one or more processors, cause the machine to identify the caller as the candidate for the customized IVR plan further cause the machine to detect a pattern in the call history of the caller.

15. The non-transitory computer-readable storage medium of claim 13, wherein the instructions, that when executed by the one or more processors, cause the machine to identify the caller as the candidate for the customized IVR plan further cause the machine to detect that the recent event is associated with frequent customer call-ins, wherein the customized IVR plan comprises presenting a status of the recent event when the subsequent call from the caller is received.

16. The non-transitory computer-readable storage medium of claim 15, wherein the recent event is an insurance claim.

17. The non-transitory computer-readable storage medium of claim 13, wherein the instructions, that when executed by the one or more processors, cause the machine to gather the information to create the customized IVR plan further cause the machine to receive user preferences from a user.

18. The non-transitory computer-readable storage medium of claim 17, wherein the customized IVR plan is a quick account balance service, wherein the instructions, that when executed by the one or more processors, cause the machine to execute, by the processor, the customized IVR plan further causes the machine to recite account balances in accordance with the user preferences.

* * * * *